United States Patent
Sugiura

(10) Patent No.: US 11,715,932 B2
(45) Date of Patent: Aug. 1, 2023

(54) INTERNAL COMBUSTION ENGINE SPARK PLUG AND METHOD OF MANUFACTURING THE SAME

(71) Applicant: DENSO CORPORATION, Kariya (JP)

(72) Inventor: Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/726,644

(22) Filed: Apr. 22, 2022

(65) Prior Publication Data
US 2022/0344911 A1    Oct. 27, 2022

(30) Foreign Application Priority Data

Apr. 26, 2021 (JP) .................. 2021-073795

(51) Int. Cl.
| | |
|---|---|
| H01T 13/06 | (2006.01) |
| H01T 13/32 | (2006.01) |
| H01T 21/02 | (2006.01) |

(52) U.S. Cl.
CPC ............. *H01T 13/06* (2013.01); *H01T 13/32* (2013.01); *H01T 21/02* (2013.01)

(58) Field of Classification Search
CPC ......... H01T 13/06; H01T 13/32; H01T 21/02; H01T 13/16; H01T 13/54; Y02T 10/12
See application file for complete search history.

(56) References Cited

U.S. PATENT DOCUMENTS

| | | | |
|---|---|---|---|
| 10,770,868 B1 | 9/2020 | Gozawa | |
| 2015/0194793 A1* | 7/2015 | Yamanaka | ............. H01T 13/54 313/141 |
| 2017/0104316 A1 | 4/2017 | Niessner et al. | |
| 2020/0006925 A1* | 1/2020 | Shigenaga | ............. H01T 13/32 |
| 2020/0358261 A1* | 11/2020 | Gozawa | ................. H01T 13/54 |

FOREIGN PATENT DOCUMENTS

| | | |
|---|---|---|
| JP | 2001-227344 | 8/2001 |
| JP | 2014-129788 | 7/2014 |
| JP | 2020-9747 | 1/2020 |
| WO | WO-2021176949 A1 * | 9/2021 |

OTHER PUBLICATIONS

Denso_wo2021176949 JP2021-140905_machine_translation_09-2021.pdf (Year: 2021).*

* cited by examiner

*Primary Examiner* — Tracie Y Green

(74) *Attorney, Agent, or Firm* — Nixon & Vanderhye P.C.

(57) ABSTRACT

A spark plug includes a plug cover provided at a tip end portion of a housing to cover an auxiliary combustion chamber where an electrical discharge gap is located. The plug cover has a curved surface portion. The curved surface portion includes an outer curved surface convexly curved outward. The curved surface portion has an inclined injection hole formed therein to allow communication between the auxiliary combustion chamber and an outside. The inclined injection hole is opened to be inclined, relative to a plug axial direction, outward in a plug radial direction toward a tip end side. In a cross section including a central axis of the inclined injection hole and along the plug axial direction, a tangent line of a portion of the outer curved surface that overlaps an extended line of the central axis of the inclined injection hole is orthogonal to the extended line.

10 Claims, 10 Drawing Sheets

INTERNAL COMBUSTION ENGINE SPARK PLUG AND METHOD OF MANUFACTURING THE SAME

CROSS-REFERENCE TO RELATED APPLICATION

The present application is based on and claims the benefit of priority from earlier Japanese Patent Application No. 2021-073795 filed on Apr. 26, 2021, the description of which is incorporated herein by reference.

BACKGROUND OF THE INVENTION

Technical Field

The present disclosure relates to an internal combustion engine spark plug and a method of manufacturing the same.

Related Art

An internal combustion engine spark plug that includes an auxiliary combustion chamber at its tip end is known.

SUMMARY

An aspect of the present disclosure provides an internal combustion engine spark plug including: a cylindrical insulator; a center electrode that is held on an inner circumferential side of the insulator and protrudes from the insulator toward a tip end side; a cylindrical housing that holds the insulator on its inner circumferential side; a ground electrode that forms an electrical discharge gap between itself and the center electrode; and a plug cover provided at a tip end portion of the housing to cover an auxiliary combustion chamber where the electrical discharge gap is located. The plug cover has a curved surface portion that includes an outer curved surface convexly curved outward. The curved surface portion has an inclined injection hole formed therein to allow communication between the auxiliary combustion chamber and an outside, the inclined injection hole being opened to be inclined, relative to a plug axial direction, outward in a plug radial direction toward the tip end side. In a cross section including a central axis of the inclined injection hole and along the plug axial direction, a tangent line of a portion of the outer curved surface that overlaps an extended line of the central axis of the inclined injection hole is orthogonal to the extended line.

DETAILED DESCRIPTION OF THE PREFERRED EMBODIMENTS

As disclosed in Japanese Unexamined Patent Application Publication No. 2020-009747, for example, an internal combustion engine spark plug that includes an auxiliary combustion chamber at its tip end is known. In the spark plug, the auxiliary combustion chamber is covered by a plug cover, whose tip end portion is decreased in thickness. This intends to prevent the tip end portion from reaching high temperatures and prevent ignition of a gas mixture prior to electrical discharge generated by the spark plug (i.e., pre-ignition).

The spark plug described in Japanese Unexamined Patent Application Publication No. 2020-009747 gives consideration to heat received from combustion in a main combustion chamber, but not to heat received from flames injected from the auxiliary combustion chamber to the main combustion chamber via an injection hole formed in the plug cover. To be more specific, no consideration is given to preventing an inner circumferential surface of the injection hole and its surrounding regions from reaching high temperatures owing to the flames. It can therefore be said that there still remains a concern about pre-ignition originated from the inner circumferential surface of the injection hole and its surrounding regions, leaving room for further improvement.

The present disclosure has been made in view of such problems, and intends to provide an internal combustion engine spark plug that can prevent pre-ignition, and a method of manufacturing the same.

First Embodiment

With reference to FIGS. 1-6, an embodiment relating to an internal combustion engine spark plug and a method of manufacturing the same will be described.

Figure 1:
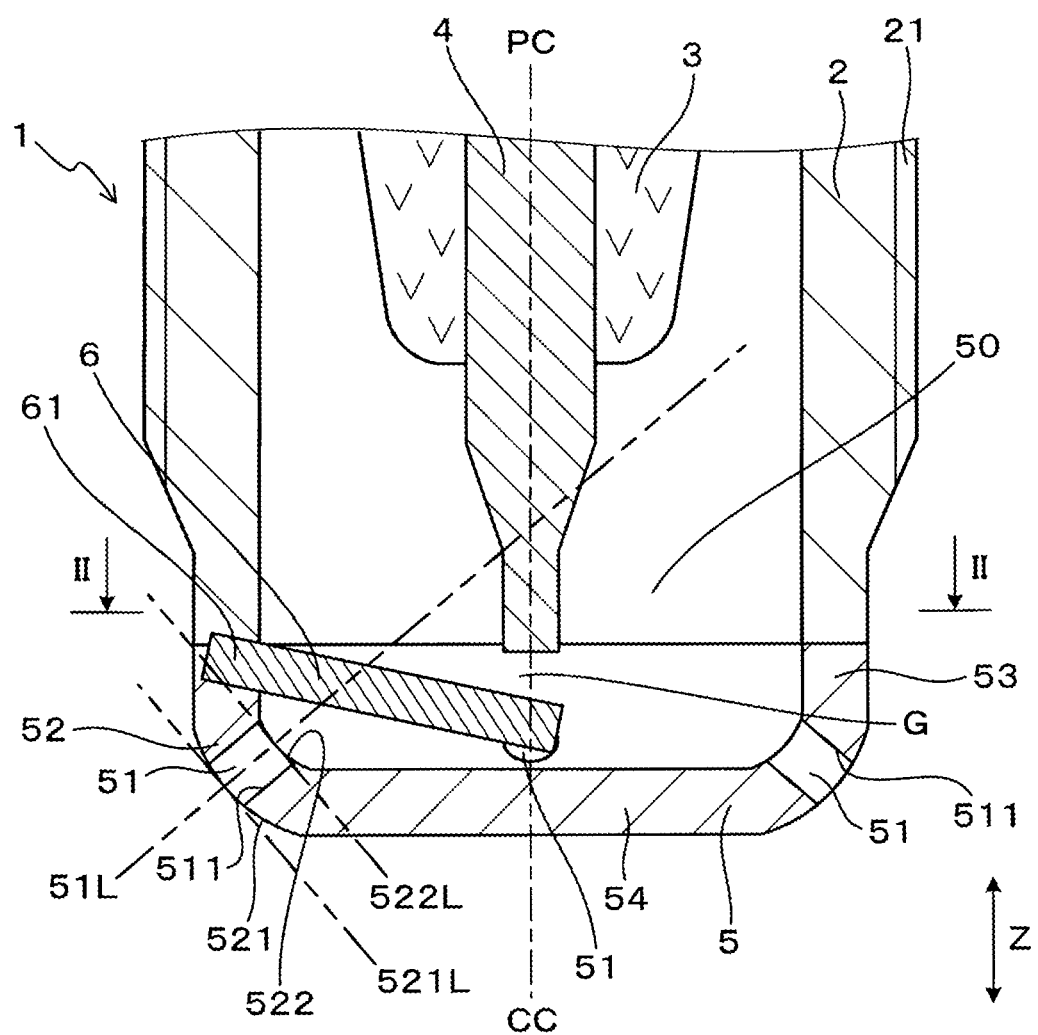
FIG. 1 is a cross-sectional view of a tip end portion and its surroundings of a spark plug in a first embodiment, along a plug axial direction, the view corresponding to a cross-sectional view taken along a line I-I in FIG. 2.
Figure 2:
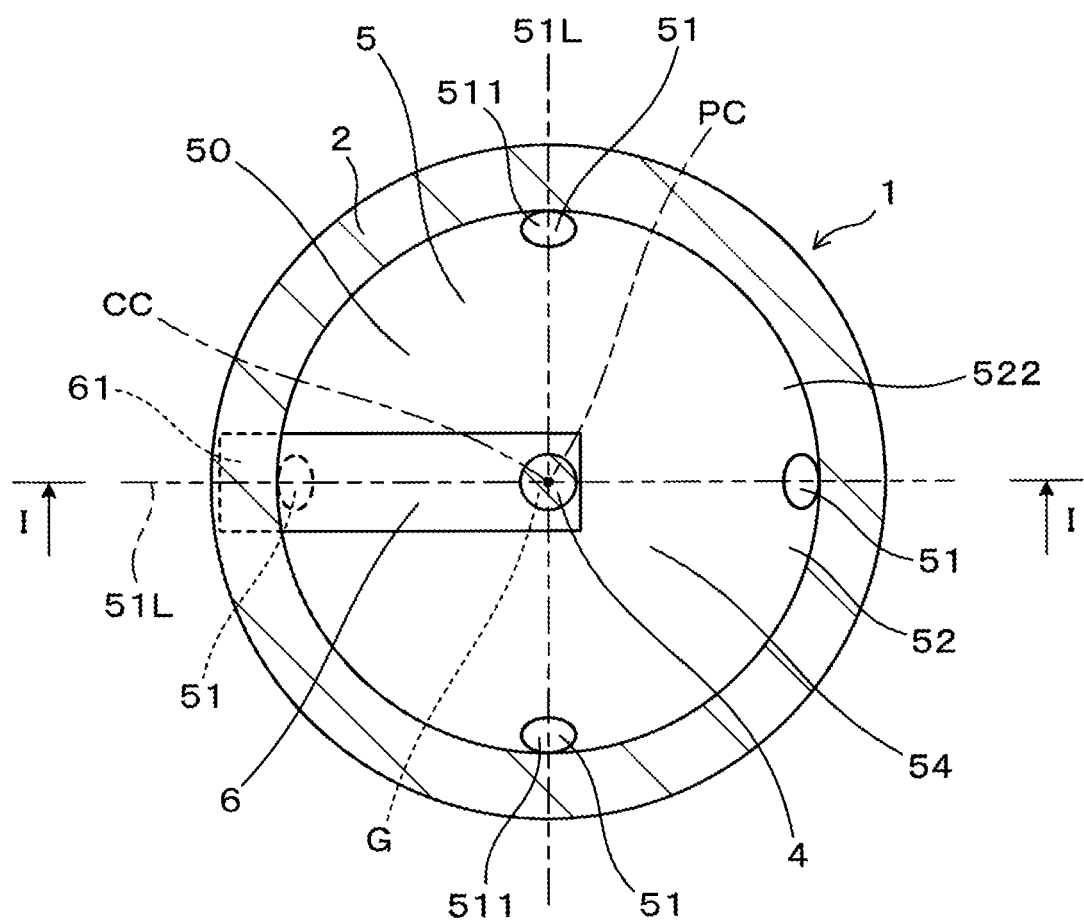
FIG. 2 is a view that corresponds to a cross-sectional view taken along a line II-II in FIG. 1.

As shown in FIGS. 1 and 2, an internal combustion engine spark plug 1 in the present embodiment has a cylindrical insulator 3, a center electrode 4, a cylindrical housing 2, a ground electrode 6, and a plug cover 5. The center electrode 4 is held on an inner circumferential side of the insulator 3 and protrudes from the insulator 3 toward a tip end side. The housing 2 holds the insulator 3 on its inner circumferential side. The ground electrode 6 forms an electrical discharge gap G between itself and the center electrode 4. The plug cover 5 is provided at a tip end portion of the housing 2 to cover an auxiliary combustion chamber 50 where the electrical discharge gap G is located.

The plug cover 5 has a curved surface portion 52. The curved surface portion 52 includes an outer curved surface 521 convexly curved outward. The curved surface portion 52 has an inclined injection hole 51 formed therein to allow communication between the auxiliary combustion chamber 50 and an outside. The inclined injection hole 51 is opened to be inclined, relative to a plug axial direction Z, outward in a plug radial direction toward the tip end side. As shown in FIG. 1, in a cross section including a central axis of the inclined injection hole 51 and along the plug axial direction Z, a tangent line 521L of a portion of the outer curved surface 521 that overlaps an extended line 51L of the central axis of the inclined injection hole 51 is orthogonal to the extended line 51L. Here, the term "orthogonal to" does not mean "being strictly orthogonal to", but includes, for example, a variation range within ±5° from "being strictly orthogonal to".

Figure 4:
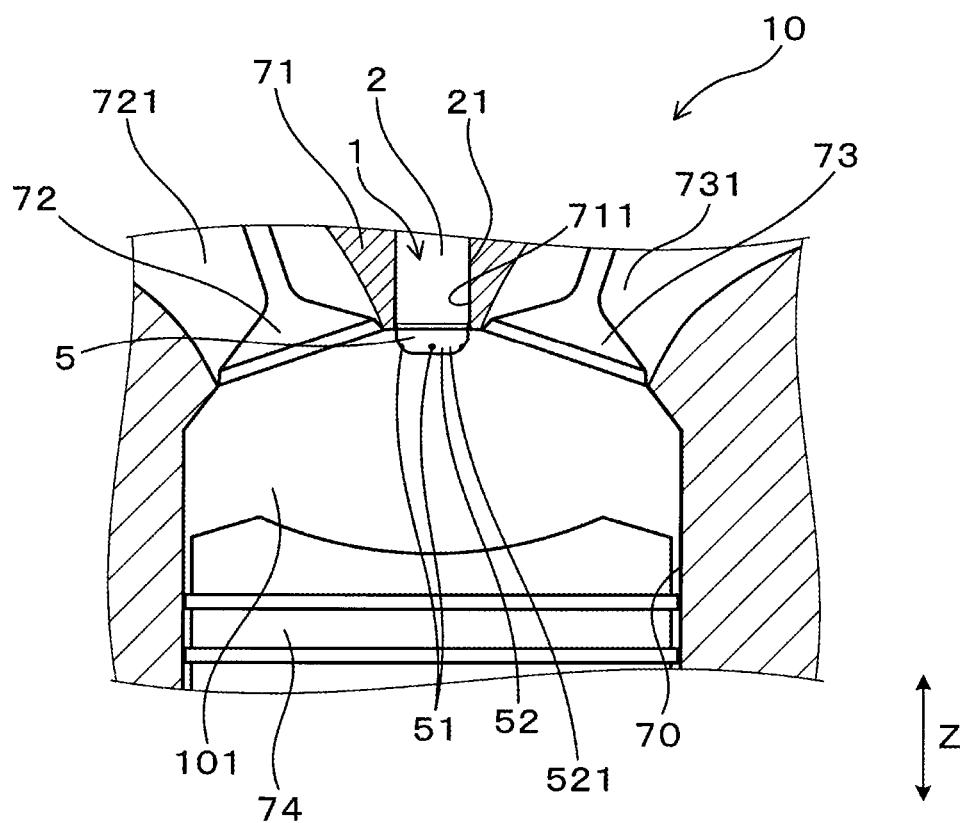
FIG. 4 is a cross-sectional view of an internal combustion engine that includes the spark plug in the first embodiment.

The spark plug 1 in the present embodiment can be used, for example, as ignition means in an internal combustion engine of an automobile and the like. As shown in FIG. 4, the spark plug 1 is attached to an internal combustion engine 10 by allowing a threaded portion 21 formed on an outer circumferential surface of the housing 2 to be screwed into an internally-threaded portion of a plug hole 711 in a cylinder head 71. With the spark plug 1 attached to the internal combustion engine 10, the housing 2 is in thermal contact with the cylinder head 71 of the internal combustion engine via the threaded portion 21.

The internal combustion engine 10 includes a piston 74 that reciprocates in a cylinder 70. Reciprocation of the piston 74 changes the volume of a main combustion chamber 101. The internal combustion engine 10 also has an intake port 721 and an exhaust port 731 both formed therein, which are respectively equipped with an intake valve 72 and an exhaust valve 73.

The spark plug 1 then has one end in its axial direction Z arranged in the main combustion chamber 101 of the internal combustion engine 10. With respect to the spark plug 1 in its axial direction Z, a side where the spark plug 1 is exposed to the main combustion chamber 101 shall be termed a tip end side, and a side opposite thereto shall be termed a base end side. The axial direction Z of the spark plug 1 shall be termed a plug axial direction Z or simply termed a Z direction, as appropriate. Note that a plug central axis PC shall mean a central axis PC of the spark plug 1. As shown in FIGS. 1 and 2, the plug central axis PC is also a central axis of the center electrode 4 in the present embodiment. The plug radial direction means a radial direction of a circle which is on a plane orthogonal to the plug central axis PC and whose center is on the plug central axis PC.

As shown in FIG. 4, with the spark plug 1 attached to the internal combustion engine 10, the plug cover 5 provides a partition between the auxiliary combustion chamber 50 and the main combustion chamber 101. The inclined injection hole 51 allows communication between the auxiliary combustion chamber 50 and the main combustion chamber 101. The plug cover 5 is constituted of a material, an example of which includes iron, nickel, alloyed iron or nickel, stainless steel, and the like.

As shown in FIG. 1, the plug cover 5 is joined to the tip end portion of the housing 2 by welding and the like such that its central axis CC overlaps the plug central axis PC. The plug cover 5 and the housing 2 are in thermal contact with each other.

In the present embodiment, the plug cover 5 has a circumferential wall portion 53 and a bottom wall portion 54. The circumferential wall portion 53 is an approximately cylindrically-shaped portion that covers a part of an outer circumferential side of the auxiliary combustion chamber 50. The bottom wall portion 54 is a portion that covers a tip end side of the auxiliary combustion chamber 50. The curved surface portion 52 links a tip end of the circumferential wall portion 53 and an outer circumference of the bottom wall portion 54 in a curved surface-like manner.

In the present embodiment, the curved surface portion 52 has a uniform thickness. Here, the term "uniform" shall permit a case where, for example, a thickness difference between the thickest portion and the thinnest portion of the curved surface portion 52 falls within 5% from the average thickness of the curved surface portion 52.

Furthermore, the curved surface portion 52 includes an inner curved surface 522 convexly curved outward. In the cross section including the central axis of the inclined injection hole 51 and along the plug axial direction Z, a tangent line 522L of a portion of the inner curved surface 522 that overlaps an extended line 51L of the central axis of the inclined injection hole 51 is orthogonal to the extended line 51L.

The curved surface portion 52 is formed on the plug cover 5 entirely in a plug circumferential direction. Each of the outer curved surface 521 and the inner curved surface 522 is formed on the curved surface portion 52 also entirely in the plug circumferential direction. Note that the plug circumferential direction shall refer to a circumferential direction of a circle which is on a plane orthogonal to the plug central axis PC and whose center is on the plug central axis PC.

Figure 3:
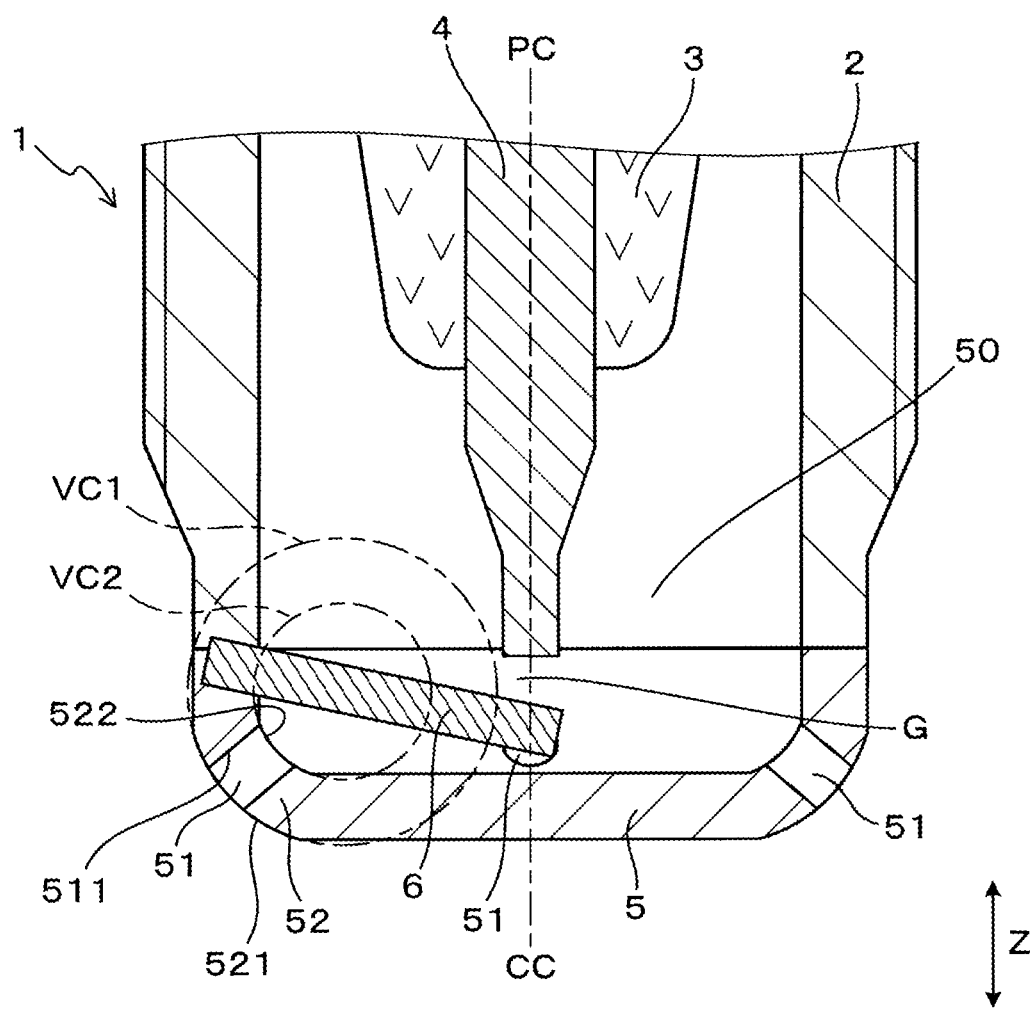
FIG. 3 is a cross-sectional view showing a virtual circle along which an outer curved surface extends and a virtual circle along which an inner curved surface extends, in the first embodiment.

As shown in FIG. 3, in a cross section including the central axis CC of the plug cover 5, the outer curved surface 521 and the inner curved surface 522 are respectively formed to extend along virtual circles VC1, VC2. Furthermore, the virtual circle VC1 along which the outer curved surface 521 extends and the virtual circle VC2 along which the inner curved surface 522 extends are circles concentric with each other.

In the present embodiment, as shown in FIG. 2, the curved surface portion 52 of the plug cover 5 has four inclined injection holes 51 formed therein. Each of the inclined injection holes 51 is formed to have an approximately circular cross-sectional shape orthogonal to its central axis. Each inclined injection hole 51 is formed to allow the extended line 51L of its central axis to substantially pass through the plug central axis PC. In the present embodiment, one of the inclined injection holes 51 overlaps the ground electrode 6 when seen in the Z direction.

As shown in FIGS. 1 and 2, the ground electrode 6 protrudes from its fixed end portion 61, which is fixed to the housing 2, into the auxiliary combustion chamber 50.

Next, description will be given a method of manufacturing the spark plug 1 in the present embodiment.

Figure 5:
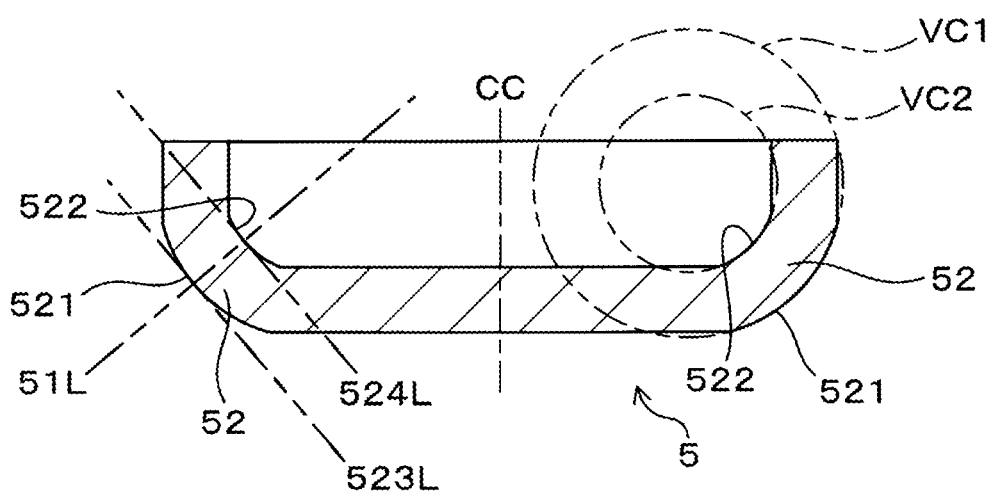
FIG. 5 is a cross-sectional view of a plug cover in a state where an inclined injection hole is yet to be opened, in the first embodiment.

The method of manufacturing the spark plug 1 in the present embodiment includes a cover forming step and an injection hole forming step. As shown in FIG. 5, the cover forming step includes forming the plug cover 5 in a state where the inclined injection hole 51 is yet to be opened, such that a tangent line 523L of a portion of the outer curved surface 521 that overlaps the extended line 51L of the central axis of the inclined injection hole 51 to be opened is orthogonal to the extended line 51L.

Figure 6:
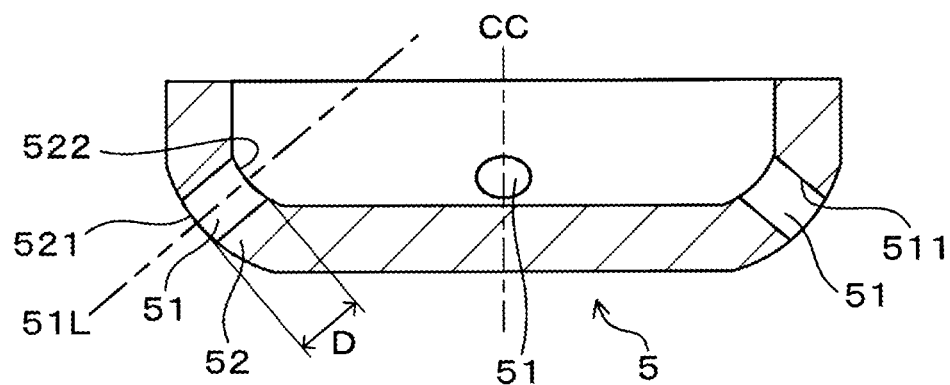
FIG. 6 is a cross-sectional view of the plug cover in a state where the inclined injection hole is opened, in the first embodiment.

As shown in FIGS. 5 and 6, the injection hole forming step includes, after the cover forming step, opening the inclined injection hole 51 at the curved surface portion 52 such that the tangent line 523L of the portion of the outer curved surface 521 that overlaps the extended line 51L of the central axis of the inclined injection hole 51 to be opened is orthogonal to the extended line 51L.

In the present embodiment, the injection hole forming step is performed on the plug cover 5 that is yet to be fixed to the housing 2. The injection hole forming step includes opening the inclined injection hole 51 by subjecting the curved surface portion 52 of the plug cover 5 to punch-stamping or drill-cutting. When stamping or cutting is performed, the inclined injection hole 51 is opened from the outer curved surface 521 toward the inner curved surface 522 at the curved surface portion 52. Furthermore, the inclined injection hole 51 is opened along a direction of a normal to the portion of the outer curved surface 521 that overlaps the extended line 51L of the central axis of the inclined injection hole 51 to be opened.

Furthermore, as shown in FIG. 5, the cover forming step includes forming the plug cover 5 in the state where the inclined injection hole 51 is yet to be opened, such that a tangent line 524L of a portion of the inner curved surface 522 that overlaps the extended line 51L of the central axis of the inclined injection hole 51 to be opened is orthogonal to the extended line 51L.

As shown in FIGS. 5 and 6, the injection hole forming step includes opening the inclined injection hole 51 at the curved surface portion 52 such that the tangent line 524L of the portion of the inner curved surface 522 that overlaps the extended line 51L of the central axis of the inclined injection hole 51 to be opened is orthogonal to the extended line 51L.

Furthermore, the cover forming step includes forming the plug cover 5 in the state where the inclined injection hole 51 is yet to be opened, by plastically working a plate-like member having a uniform thickness. As shown in FIG. 5, the cover forming step also includes forming the curved surface portion 52 such that, in the cross section including the central axis CC of the plug cover 5, the outer curved surface 521 and the inner curved surface 522 respectively extend along the virtual circles VC1, VC2. The cover forming step also includes forming the curved surface portion 52 such that the virtual circle VC1 along which the outer curved surface 521 extends and the virtual circle VC2 along which the inner curved surface 522 extends are circles concentric with each other.

With the cover forming step and the injection hole forming step described above, the plug cover 5 having the inclined injection hole 51 formed therein can be obtained. The plug cover 5 having the inclined injection hole 51 formed therein is then fixed to the housing 2 by welding or the like. As shown in FIGS. 1 and 2, the spark plug 1 in the present embodiment can thereby be obtained.

Next, actions and effects of the present embodiment will be described.

In the above-described spark plug 1, in the cross section including the central axis of the inclined injection hole 51 and along the plug axial direction Z, the tangent line 521L of the portion of the outer curved surface 521 that overlaps the extended line 51L of the central axis of the inclined injection hole 51 is orthogonal to the extended line 51L of the central axis of the inclined injection hole 51. The inclined injection hole 51 thus tends to have an inner circumferential surface 511 decreased in area. The amount of heat received by the inner circumferential surface 511 of the inclined injection hole 51, owing to flames injected from the auxiliary combustion chamber 50 to the main combustion chamber via the inclined injection hole 51, can thus be reduced. The inner circumferential surface 511 of the inclined injection hole 51 and its surrounding regions can thus be prevented from reaching high temperatures. Consequently, pre-ignition can be prevented.

The spark plug 1 generates electrical discharge at the electrical discharge gap G to thereby ignite a gas mixture in the auxiliary combustion chamber 50 and form flames. The flames generated in the auxiliary combustion chamber 50 are then injected to the main combustion chamber via the inclined injection hole 51. The inner circumferential surface 511 of the inclined injection hole 51 therefore receives heat owing to the injected flames. The inner circumferential surface 511 of the inclined injection hole 51 thus tends to receive a larger amount of heat and reach higher temperatures as it has a larger area. Here, in the spark plug 1 in the present embodiment, in the cross section including the central axis of the inclined injection hole 51 and along the Z direction, the tangent line 521L is orthogonal to the extended line 51L of the central axis of the inclined injection hole 51. As shown in FIG. 6, the inclined injection hole 51 thus tends to be decreased in length D in its opening direction. The inner circumferential surface 511 of the inclined injection hole 51 thus tends to be decreased in area. The amount of heat received by the inner circumferential surface 511 of the inclined injection hole 51, owing to flames injected to the main combustion chamber, can thus be reduced. The inner circumferential surface 511 of the inclined injection hole 51 and its surrounding regions can thus be prevented from reaching high temperatures. An internal combustion engine of an automobile and the like, having the spark plug 1 installed therein, can thus prevent pre-ignition even during high-load operation and the like. Consequently, the internal combustion engine can improve fuel efficiency and output.

In the cross section including the central axis of the inclined injection hole 51 and along the plug axial direction Z, the tangent line 522L (see FIG. 1) is orthogonal to the extended line 51L. The inclined injection hole 51 thus tends to be further decreased in length in its opening direction. The inner circumferential surface 511 of the inclined injection hole 51 thus tends to be further decreased in area. Consequently, pre-ignition can further be prevented.

In the cross section including the central axis CC of the plug cover 5, the outer curved surface 521 and the inner curved surface 522 are respectively formed to extend along the virtual circles VC1, VC2. Furthermore, the virtual circle VC1 along which the outer curved surface 521 extends and the virtual circle VC2 along which the inner curved surface 522 extends are circles concentric with each other. The inclined injection hole 51 thus tends to be much further decreased in length in its opening direction. The inner circumferential surface 511 of the inclined injection hole 51 thus tends to be much further decreased in area. Consequently, pre-ignition can much further be prevented.

The above-described method of manufacturing the spark plug 1 includes opening the inclined injection hole 51 at the curved surface portion 52 such that the tangent line 523L of the portion of the outer curved surface 521 that overlaps the extended line 51L of the central axis of the inclined injection hole 51 to be opened is orthogonal to the extended line 51L of the central axis of the inclined injection hole 51. The inclined injection hole 51 can thus be formed such that the inner circumferential surface 511 of the inclined injection hole 51 is decreased in area. Consequently, the spark plug 1 that can prevent pre-ignition can be manufactured.

Furthermore, the cover forming step includes forming the plug cover 5 in the state where the inclined injection hole 51 is yet to be opened, such that the tangent line 523L of the portion of the outer curved surface 521 that overlaps the extended line 51L of the central axis of the inclined injection hole 51 to be opened is orthogonal to the extended line 51L. This facilitates forming the inclined injection hole 51 such that the inner circumferential surface 511 of the inclined injection hole 51 is decreased in area. Consequently, the spark plug 1 that can prevent pre-ignition can be manufactured efficiently.

Figure 7:
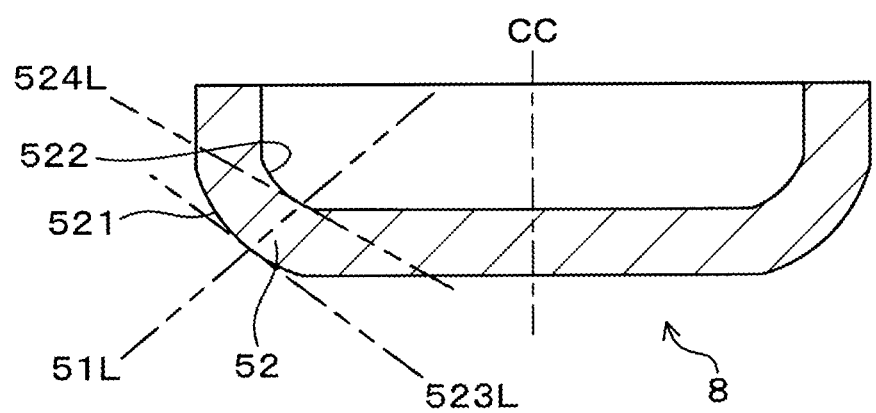
FIG. 7 is a cross-sectional view of a plug cover in a state where an inclined injection hole is yet to be opened, in a comparative embodiment.
Figure 8:
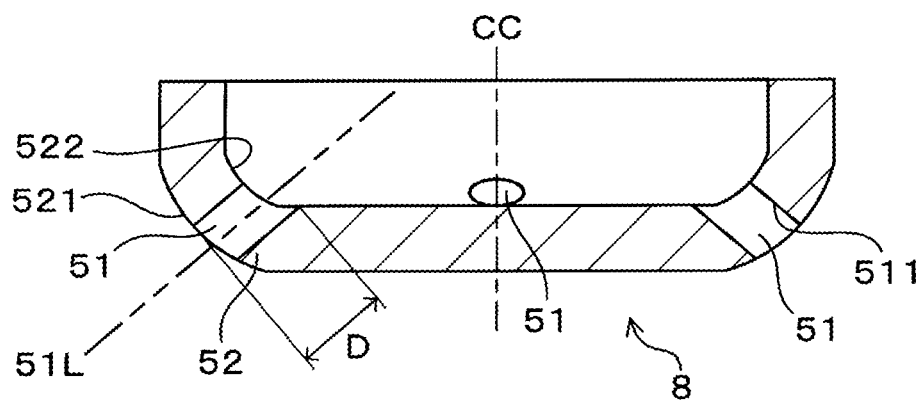
FIG. 8 is a cross-sectional view of the plug cover in a state where the inclined injection hole is opened, in the comparative embodiment.

As shown in FIGS. 7 and 8, assume a case where the inclined injection hole 51 is opened such that the tangent line 523L is not orthogonal to the extended line 51L. If a plug cover 8 in this comparative embodiment is manufactured as shown in FIG. 8, the inclined injection hole 51 tends to be increased in length D in its opening direction, in comparison with the case, as shown in FIG. 6, where the inclined injection hole 51 is opened such that the tangent line 523L is orthogonal to the extended line 51L. The inner circumferential surface 511 of the inclined injection hole 51 therefore tends to be increased in area. In the case of the present embodiment, on the contrary, the inclined injection hole 51 is opened such that the tangent line 523L is orthogonal to the extended line 51L, as described above. As shown in FIG. 6, the inclined injection hole 51 thus tends to be decreased in length D in its opening direction. The inner circumferential surface 511 of the inclined injection hole 51 therefore tends to be decreased in area. Consequently, the spark plug 1 that can prevent pre-ignition can be manufactured.

Furthermore, in the present embodiment, the inclined injection hole 51 is opened along the direction of the normal to the portion of the outer curved surface 521 that overlaps the extended line 51L of the central axis of the inclined injection hole 51 to be opened. When the inclined injection hole 51 is opened from the outer curved surface 521 toward the inner curved surface 522 by punch-stamping or drill-cutting, a tip end of the punch or drill is thus less likely to slip. This facilitates opening the inclined injection hole 51 at the curved surface portion 52 by stamping or cutting. In other words, the inclined injection hole 51 can be opened efficiently without laser processing, electrical discharge machining, or the like. Consequently, the spark plug 1 that can prevent pre-ignition can be manufactured efficiently.

The cover forming step includes forming the plug cover 5 in the state where the inclined injection hole 51 is yet to be opened, such that the tangent line 524L (see FIG. 5) is orthogonal to the extended line 51L. The injection hole forming step includes opening the inclined injection hole 51 at the curved surface portion 52 such that the tangent line 524L is orthogonal to the extended line 51L. The inclined injection hole 51 can thus be formed such that the inclined injection hole 51 is further decreased in length in its opening direction. The inclined injection hole 51 can thus be formed such that the inner circumferential surface 511 of the inclined injection hole 51 is further decreased in area. Consequently, the spark plug 1 that can further prevent pre-ignition can be manufactured.

Furthermore, the curved surface portion 52 has a uniform thickness. This facilitates opening the inclined injection hole 51 such that both of the tangent line 523L and the tangent line 524L are orthogonal to the extended line 51L. The inclined injection hole 51 thus tends to be further decreased in length in its opening direction. The inner circumferential surface 511 of the inclined injection hole 51 thus tends to be further decreased in area. Consequently, pre-ignition can further be prevented.

Furthermore, in the present embodiment, the cover forming step includes forming the plug cover 5 in the state where the inclined injection hole 51 is yet to be opened, by plastically working a plate-like member having a uniform thickness. The cover forming step also includes forming the curved surface portion 52 such that, in the cross section including the central axis CC of the plug cover 5, the outer curved surface 521 and the inner curved surface 522 respectively extend along the virtual circles VC1, VC2. The cover forming step also includes forming the curved surface portion 52 such that the virtual circle VC1 along which the outer curved surface 521 extends and the virtual circle VC2 along which the inner curved surface 522 extends are circles concentric with each other. The inclined injection hole 51 can thus be formed such that the inclined injection hole 51 is much further decreased in length in its opening direction. The inclined injection hole 51 can thus be formed such that the inner circumferential surface 511 of the inclined injection hole 51 is much further decreased in area. Consequently, the spark plug 1 that can much further prevent pre-ignition can be manufactured.

As described above, in the spark plug 1 in the present embodiment, the inner circumferential surface 511 of the inclined injection hole 51 tends to be decreased in area. A flame jet injected to the main combustion chamber via the inclined injection hole 51 is therefore less likely to be cooled by the inner circumferential surface 511 of the inclined injection hole 51. The flame jet can thus be intensified. Consequently, ignition properties in the main combustion chamber can be improved.

In the cover forming step, the plug cover 5 can be formed to suit the opening direction of the inclined injection hole 51 to be opened. This facilitates forming the inclined injection hole 51 such that the inclined injection hole 51 is opened in a desired direction with its inner circumferential surface 511 decreased in area. In other words, the inclined injection hole 51 can be formed such that the inner circumferential surface 511 is decreased in area, while the flame jet can be prevented from approaching the piston and the like in consideration of an inclination angle of a base end surface of the main combustion chamber, a cylinder diameter, the shape of a base end surface of the piston, and the like. The inclined injection hole 51 can thus be formed such that cooling loss of the flame jet can be reduced while the heat received by the inner circumferential surface 511 of the inclined injection hole 51 is reduced. Consequently, the spark plug 1 that can prevent pre-ignition and improve ignition properties can be manufactured.

In the spark plug 1 in the present embodiment, the inclined injection hole 51 tends to be decreased in length in its opening direction. The flame jet thus tends to be injected toward the main combustion chamber in a spreading manner and its injecting speed tends to be decreased. The flame jet can thus further be prevented from approaching the piston and the like. Cooling loss of the flame jet can further be reduced. Consequently, ignition properties can further be improved. Furthermore, the decrease in flame jet injecting speed can prospectively reduce pseudo knocking sounds caused by the flame jet being injected.

The tangent line 522L is orthogonal to the extended line 51L, so that the direction of gas expansion caused by combustion in the auxiliary combustion chamber 50 tends to coincide with the opening direction of the inclined injection hole 51. This facilitates intensifying the flame jet. Consequently, ignition properties can be improved.

According to the present embodiment, as described above, the internal combustion engine spark plug 1 that can prevent pre-ignition and the method of manufacturing the same can be provided.

Second Embodiment

Figure 9:
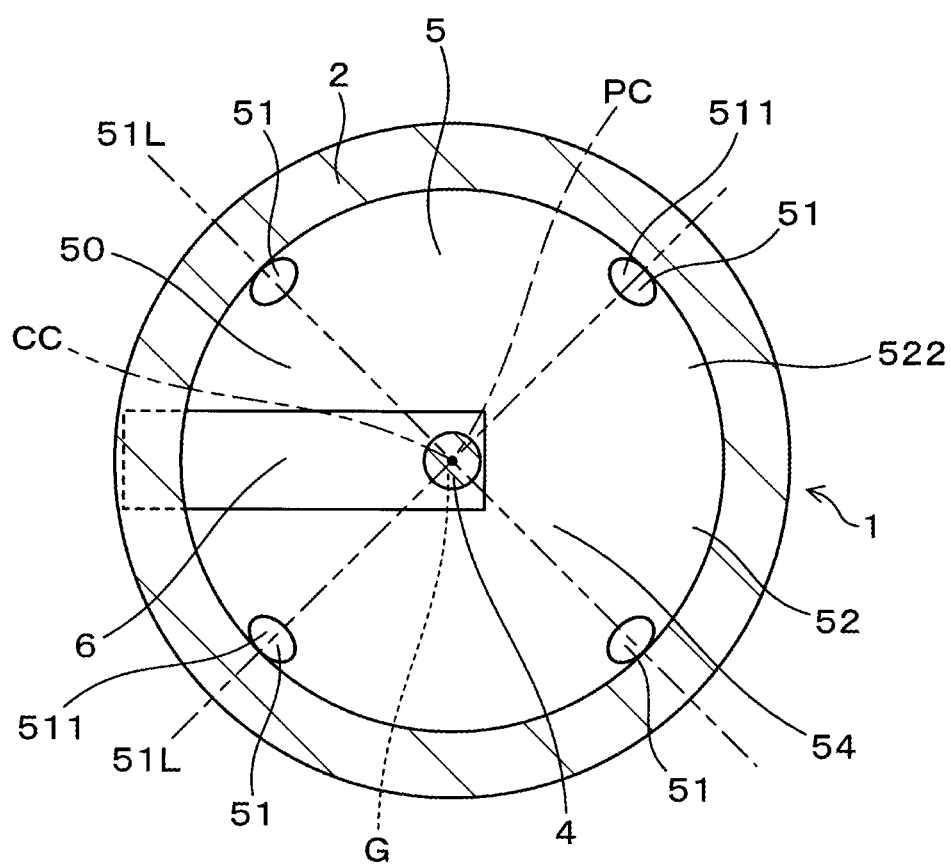
FIG. 9 is a cross-sectional view of a tip end portion of a spark plug in a second embodiment, taken orthogonally to a plug axial direction.

As shown in FIG. 9, the present embodiment is obtained by modifying the first embodiment in position to form the inclined injection hole 51.

In the present embodiment, as shown in FIG. 9, the inclined injection hole 51 is formed so as not to overlap the ground electrode 6 when seen in the Z direction.

The other features are similar to those of the first embodiment. Note that unless otherwise specified, a sign used in the second and following embodiments and identical to a sign used in the embodiment(s) that has/have already been discussed represents a component or the like similar to that in the embodiment(s) that has/have already been discussed.

The present embodiment also has actions and effects similar to those of the first embodiment.

Third Embodiment

Figure 10:
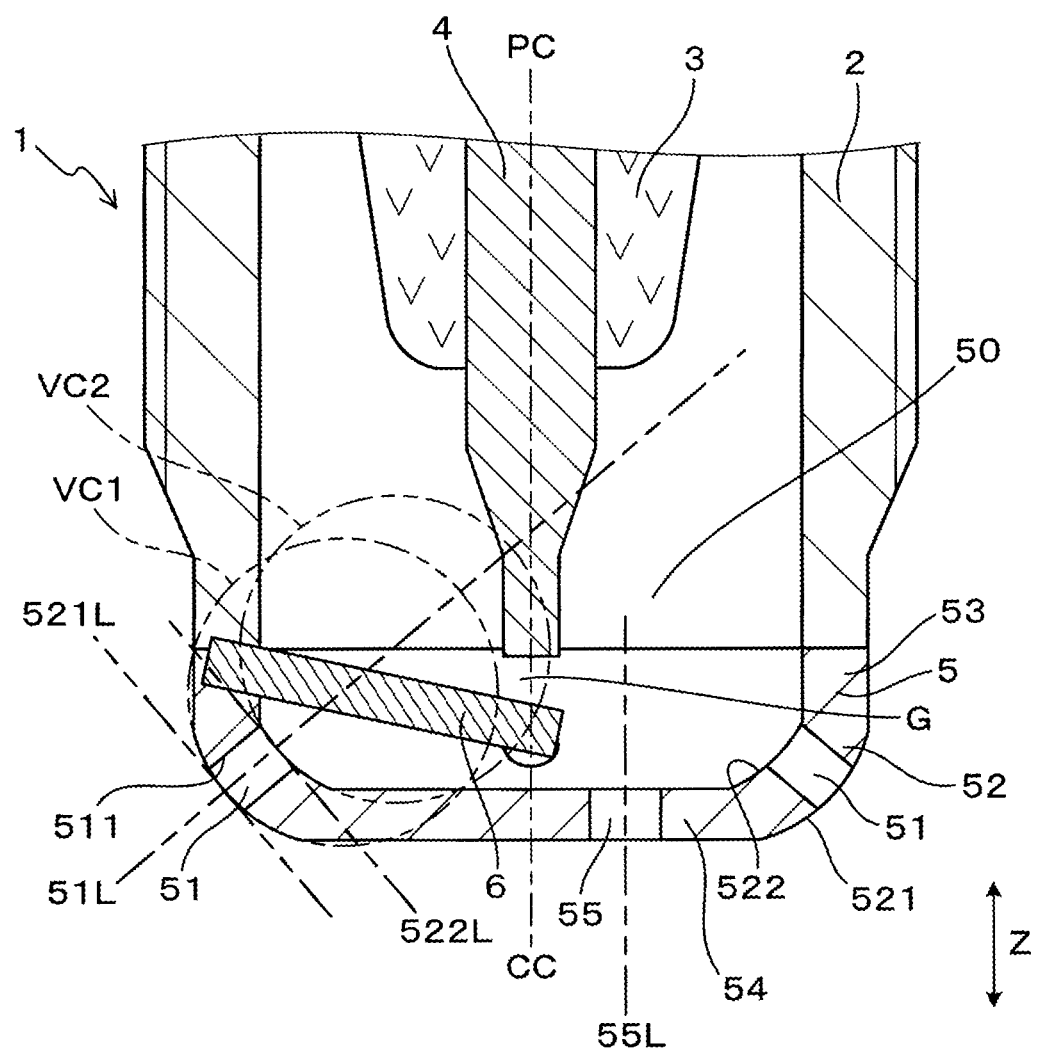
FIG. 10 is a cross-sectional view of a tip end portion and its surroundings of a spark plug in a third embodiment, along a plug axial direction.

As shown in FIG. 10, the present embodiment is obtained by modifying the first embodiment in shape of the plug cover 5.

In the present embodiment, as shown in FIG. 10, the virtual circle VC1 along which the outer curved surface 521 extends and the virtual circle VC2 along which the inner curved surface 522 extends have approximately the same diameters. Furthermore, in the cross section including the central axis CC of the plug cover 5, the virtual circle VC1 along which the outer curved surface 521 extends and the virtual circle VC2 along which the inner curved surface 522 extends have centers different from each other.

In the present embodiment, the bottom wall portion 54 of the plug cover 5 further has an axial-direction injection hole 55 formed therein. The axial-direction injection hole 55 is formed such that an extended line 55L of its central axis extends along the plug axial direction Z. Furthermore, the axial-direction injection hole 55 is formed at a position closer to the plug central axis PC than the inclined injection hole 51 is.

The other configurations and the actions and effects are similar to those of the first embodiment.

Fourth Embodiment

Figure 11:
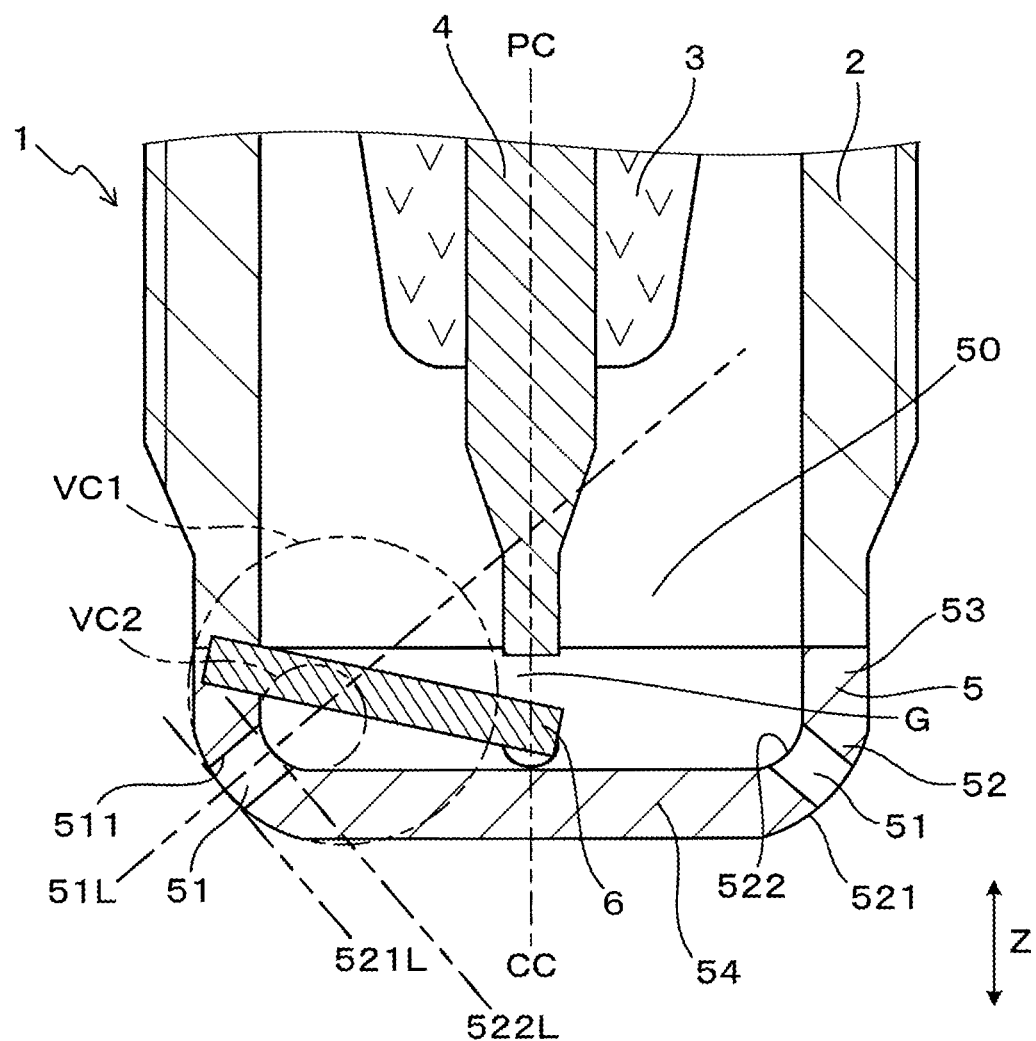
FIG. 11 is a cross-sectional view of a tip end portion and its surroundings of a spark plug in a fourth embodiment, along a plug axial direction.

As shown in FIG. 11, the present embodiment is obtained by modifying the third embodiment in shape of the plug cover 5.

In the present embodiment, as shown in FIG. 11, the virtual circle VC2 along which the inner curved surface 522 extends has a diameter equal to or smaller than a radius of the virtual circle VC1 along which the outer curved surface 521 extends.

Furthermore, the curved surface portion 52 has a smaller thickness further from the circumferential wall portion 53 and further from the bottom wall portion 54.

Except for this, the present embodiment is similar to the third embodiment.

The curved surface portion 52 has a smaller thickness further from the circumferential wall portion 53 and further from the bottom wall portion 54. The inner circumferential surface 511 of the inclined injection hole 51 thus tends to be further decreased in area. Consequently, pre-ignition can further be prevented.

Except for this, the present embodiment has actions and effects similar to those of the third embodiment.

Fifth Embodiment

Figure 12:
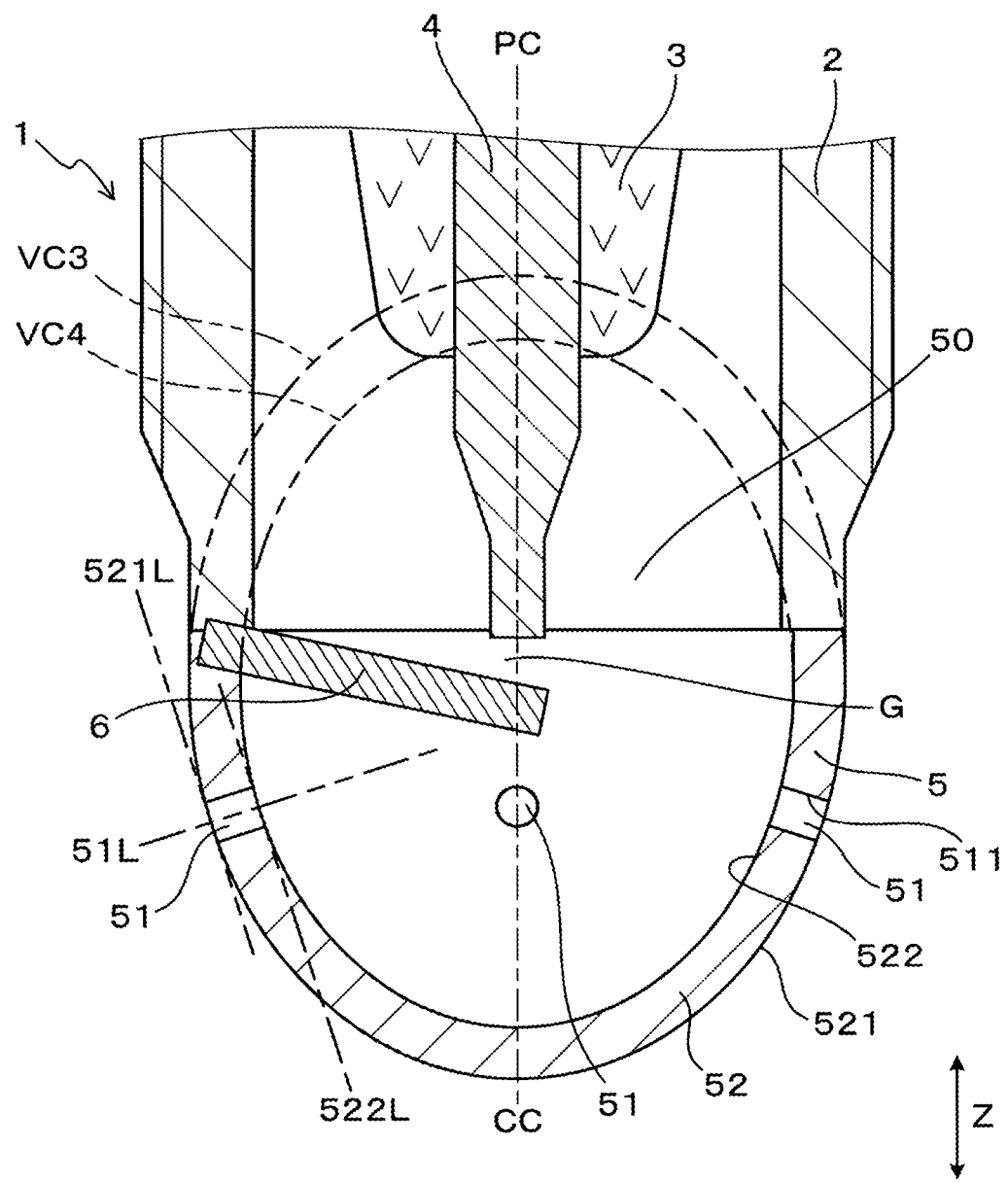
FIG. 12 is a cross-sectional view of a tip end portion and its surroundings of a spark plug in a fifth embodiment, along a plug axial direction.

As shown in FIG. 12, the present embodiment is obtained by modifying the first embodiment in shape of the plug cover 5.

In the present embodiment, as shown in FIG. 12, the curved surface portion 52 of the plug cover 5 assumes the shape of a surface curved convexly on the tip end side. Furthermore, the curved surface portion 52 has a uniform thickness.

In the cross section including the central axis CC of the plug cover 5, the outer curved surface 521 and the inner curved surface 522 are respectively formed to extend along virtual ellipses VC3, VC4.

In the cross section including the central axis of the inclined injection hole 51 and along the Z direction, the tangent line 521L and the tangent line 522L are orthogonal to the extended line 51L.

The other configurations and the actions and effects are similar to those of the first embodiment.

Sixth Embodiment

Figure 13:
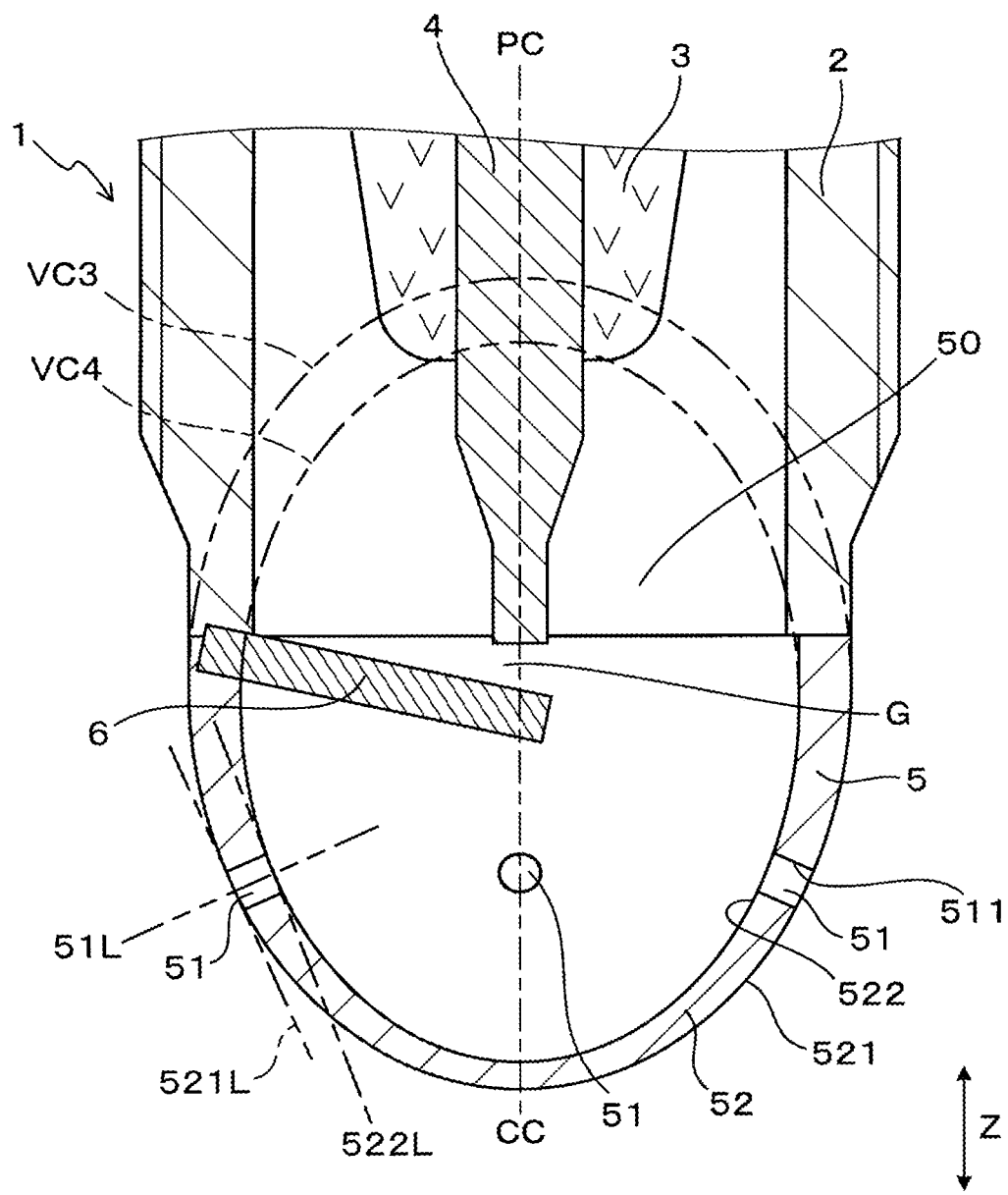
FIG. 13 is a cross-sectional view of a tip end portion and its surroundings of a spark plug in a sixth embodiment, along a plug axial direction.

As shown in FIG. 13, the present embodiment is obtained by modifying the fifth embodiment in shape of the plug cover 5.

In the present embodiment, as shown in FIG. 13, the curved surface portion 52 has a larger thickness toward the base end side. In other words, the curved surface portion 52 has a smaller thickness as it is closer to the plug central axis PC.

Furthermore, in the cross section including the central axis of the inclined injection hole 51 and along the Z direction, the tangent line 522L is inclined relative to the extended line 51L.

Except for this, the present embodiment is similar to the fifth embodiment.

The curved surface portion 52 has a larger thickness toward the base end side. Heat of a tip end portion of the curved surface portion 52 thus tends to be transferred to the base end side. The tip end portion of the curved surface portion 52 can thus be prevented from reaching high temperatures. Consequently, pre-ignition can be prevented.

In other words, the tip end portion of the curved surface portion 52 is at a longer distance from the housing 2 than a base end portion of the curved surface portion 52 is. The tip end portion of the curved surface portion 52 is therefore less likely to dissipate heat via the housing 2 to the outside than the base end portion of the curved surface portion 52 is. The tip end portion of the curved surface portion 52 therefore tends to reach higher temperatures than the base end portion of the curved surface portion 52 does. Here, the spark plug 1 in the present embodiment has the curved surface portion 52 whose thickness is larger toward the base end side. Heat of the tip end portion of the curved surface portion 52 thus tends to be transferred to the base end side of the curved surface portion 52. Heat of the tip end portion of the curved surface portion 52 thus tends to be dissipated via the housing 2 to the outside. Consequently, pre-ignition can be prevented.

Except for this, the present embodiment has actions and effects similar to those of the fifth embodiment.

The first to sixth embodiments, described above, each have four inclined injection holes 51 formed in the curved surface portion 52. It is noted that the curved surface portion can have less than or more than four inclined injection holes formed therein.

The present disclosure is not limited to each of the above-described embodiments, and is applicable to various embodiments without departing from the gist thereof.

An aspect of the present disclosure provides an internal combustion engine spark plug (1) including:

a cylindrical insulator (3);

a center electrode (4) that is held on an inner circumferential side of the insulator and protrudes from the insulator toward a tip end side;

a cylindrical housing (2) that holds the insulator on its inner circumferential side;

a ground electrode (6) that forms an electrical discharge gap (G) between itself and the center electrode; and a plug cover (5) provided at a tip end portion of the housing to cover an auxiliary combustion chamber (50) where the electrical discharge gap is located, the plug cover having a curved surface portion (52) that includes an outer curved surface (521) convexly curved outward, the curved surface portion having an inclined injection hole (51) formed therein to allow communication between the auxiliary combustion chamber and an outside, the inclined injection hole (51) being opened to be inclined, relative to a plug axial direction (Z), outward in a plug radial direction toward the tip end side, and in a cross section including a central axis of the inclined injection hole and along the plug axial direction, a tangent line (521L) of a portion of the outer curved surface that overlaps an extended line (51L) of the central axis of the inclined injection hole being orthogonal to the extended line.

Another aspect of the present disclosure provides a method of manufacturing an internal combustion engine spark plug (1) including a cylindrical insulator (3), a center electrode (4) that is held on an inner circumferential side of the insulator and protrudes from the insulator toward a tip end side, a cylindrical housing (2) that holds the insulator on its inner circumferential side, a ground electrode (6) that forms an electrical discharge gap (G) between itself and the center electrode, and a plug cover (5) provided at a tip end portion of the housing to cover an auxiliary combustion chamber (50) where the electrical discharge gap is located, the plug cover having a curved surface portion (52) that includes an outer curved surface (521) convexly curved outward, and the curved surface portion having an inclined injection hole (51) formed therein to allow communication between the auxiliary combustion chamber and an outside, the inclined injection hole (51) being opened to be inclined, relative to a plug axial direction (Z), outward in a plug radial direction toward the tip end side, the method including:

a cover forming step of forming the plug cover in a state where the inclined injection hole is yet to be opened, such that a tangent line (523L) of a portion of the outer curved surface that overlaps an extended line (51L) of a central axis of the inclined injection hole to be opened is orthogonal to the extended line; and an injection hole forming step of, after the cover forming step, opening the inclined injection hole at the curved surface portion such that the tangent line of the portion of the outer curved surface that overlaps the extended line of the central axis of the inclined injection hole to be opened is orthogonal to the extended line.

In the above-described spark plug, in the cross section including the central axis of the inclined injection hole and along the plug axial direction, the tangent line of the portion of the outer curved surface that overlaps the extended line of the central axis of the inclined injection hole is orthogonal to the extended line of the central axis of the inclined injection hole. The inner circumferential surface of the inclined injection hole thus tends to be decreased in area. The amount of heat received by the inner circumferential surface of the inclined injection hole, owing to flames injected from the auxiliary combustion chamber to the main combustion chamber via the inclined injection hole, can thus be reduced. The inner circumferential surface of the inclined injection hole and its surrounding regions can thus be prevented from reaching high temperatures. Consequently, pre-ignition can be prevented.

In the above-described method of manufacturing the spark plug, the inclined injection hole is opened at the curved surface portion such that the tangent line of the portion of the outer curved surface that overlaps the extended line of the central axis of the inclined injection hole to be opened is orthogonal to the extended line of the central axis of the inclined injection hole. The inclined injection hole can thus be formed such that the inner circumferential surface of the inclined injection hole is decreased in area. Consequently, a spark plug that can prevent pre-ignition can be manufactured.

As described above, according to the above-described aspects, an internal combustion engine spark plug that can prevent pre-ignition and the method of manufacturing the same can be provided.

What is claimed is:

1. An internal combustion engine spark plug comprising:
a cylindrical insulator;
a center electrode that is held on an inner circumferential side of the insulator and protrudes from the insulator toward a tip end side;
a cylindrical housing that holds the insulator on its inner circumferential side;
a ground electrode that forms an electrical discharge gap between itself and the center electrode; and
a plug cover provided at a tip end portion of the housing to cover an auxiliary combustion chamber where the electrical discharge gap is located, wherein
the plug cover has a curved surface portion that includes an outer curved surface convexly curved outward,
the curved surface portion has an inclined injection hole formed therein to allow communication between the auxiliary combustion chamber and an outside, the inclined injection hole being opened to be inclined, relative to a plug axial direction, outward in a plug radial direction toward the tip end side,
in a cross section including a central axis of the inclined injection hole and along the plug axial direction, a tangent line of a portion of the outer curved surface that overlaps an extended line of the central axis of the inclined injection hole is orthogonal to the extended line; wherein:
the curved surface portion has a uniform thickness;
the curved surface portion includes an inner curved surface convexly curved outward, in a cross section including a central axis of the plug cover, the outer curved surface and the inner curved surface are respectively formed to extend along virtual circles, and the virtual circle along which the outer curved surface extends and the virtual circle along which the inner curved surface extends are circles concentric with each other.

2. The internal combustion engine spark plug according to claim 1, wherein in the cross section including the central axis of the inclined injection hole and along the plug axial direction, a tangent line of a portion of the inner curved surface that overlaps the extended line of the central axis of the inclined injection hole is orthogonal to the extended line.

3. A method of manufacturing an internal combustion engine spark plug that includes a cylindrical insulator, a center electrode that is held on an inner circumferential side of the insulator and protrudes from the insulator toward a tip end side, a cylindrical housing that holds the insulator on its inner circumferential side, a ground electrode that forms an electrical discharge gap between itself and the center electrode, and a plug cover provided at a tip end portion of the housing to cover an auxiliary combustion chamber where the electrical discharge gap is located, the plug cover having a curved surface portion that includes an outer curved surface convexly curved outward, and the curved surface portion having an inclined injection hole formed therein to allow communication between the auxiliary combustion chamber and an outside, the inclined injection hole being opened to be inclined, relative to a plug axial direction, outward in a plug radial direction toward the tip end side, the method comprising:

a cover forming step of forming the plug cover in a state where the inclined injection hole is yet to be opened, such that a tangent line of a portion of the outer curved surface that overlaps an extended line of a central axis of the inclined injection hole to be opened is orthogonal to the extended line; and an injection hole forming step of, after the cover forming step, opening the inclined injection hole at the curved surface portion such that the tangent line of the portion of the outer curved surface that overlaps the extended line of the central axis of the inclined injection hole to be opened is orthogonal to the extended line; wherein the curved surface portion includes an inner curved surface convexly curved outward, and the cover forming step includes forming the plug cover in the state where the inclined injection hole is yet to be opened, by plastically working a plate-like member having a uniform thickness, and forming the curved surface portion such that, in a cross section including a central axis of the plug cover, the outer curved surface and the inner curved surface respectively extend along virtual circles and that the virtual circle along which the outer curved surface extends and the virtual circle along which the inner curved surface extends are circles concentric with each other.

4. The method of manufacturing the internal combustion engine spark plug according to claim 3, wherein the cover forming step includes forming the plug cover in the state where the inclined injection hole is yet to be opened, such that a tangent line of a portion of the inner curved surface that overlaps the extended line of the central axis of the inclined injection hole to be opened is orthogonal to the extended line, and the injection hole forming step includes opening the inclined injection hole at the curved surface portion such that the tangent line of the portion of the inner curved surface that overlaps the extended line of the central axis of the inclined injection hole to be opened is orthogonal to the extended line.

5. The method of manufacturing the internal combustion engine spark plug according to claim 3, wherein:

in the cross section including the central axis of the inclined injection hole and along the plug axial direction, the extended line of the central axis of the inclined injection hole overlaps the center electrode.

6. The method of manufacturing the internal combustion engine spark plug according to claim 3, wherein:

in the cross section including the central axis of the inclined injection hole and along the plug axial direction, both (i) the virtual circle along which the outer curved surface extends and (ii) the virtual circle along which the inner curved surface extends overlap with the ground electrode.

7. The method of manufacturing the internal combustion engine spark plug according to claim 3, wherein in the cross section including the central axis of the inclined injection hole and along the plug axial direction, diametrically opposing points of the virtual circle along which the inner curved surface extends overlap with the ground electrode.

8. The internal combustion engine spark plug according to claim 1, wherein in the cross section including the central axis of the inclined injection hole and along the plug axial direction, the extended line of the central axis of the inclined injection hole overlaps the center electrode.

9. The internal combustion engine spark plug according to claim 1, wherein in the cross section including the central axis of the inclined injection hole and along the plug axial direction, both (i) the virtual circle along which the outer curved surface extends and (ii) the virtual circle along which the inner curved surface extends overlap with the ground electrode.

10. The internal combustion engine spark plug according to claim 1, wherein in the cross section including the central axis of the inclined injection hole and along the plug axial direction, diametrically opposing points of the virtual circle along which the inner curved surface extends overlap with the ground electrode.

* * * * *